Oct. 17, 1961   R. G. MANCHESTER   3,004,883
FILM SPLICING DEVICE

Filed Dec. 29, 1958   2 Sheets-Sheet 1

INVENTOR
ROWE G. MANCHESTER
*Fred N. Schwend*
ATTORNEY

Oct. 17, 1961  R. G. MANCHESTER  3,004,883
FILM SPLICING DEVICE
Filed Dec. 29, 1958  2 Sheets-Sheet 2
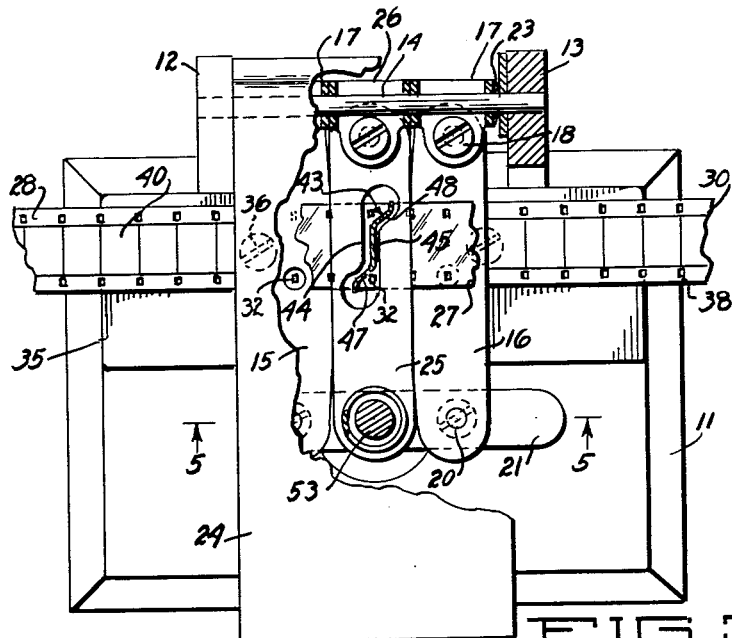
FIG. 3.
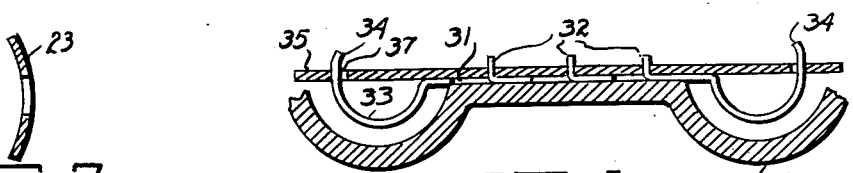
FIG. 7.  FIG. 4.
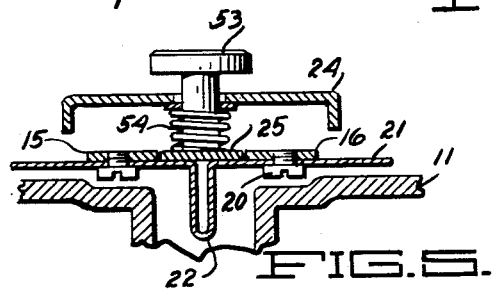
FIG. 5.
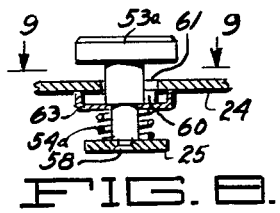
FIG. 9.
FIG. 8.
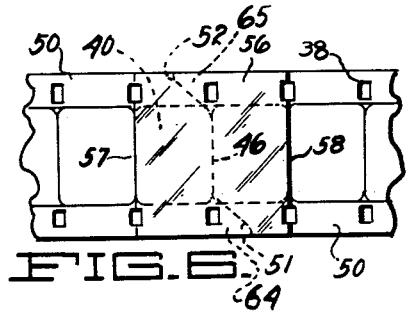
FIG. 6.
INVENTOR
ROWE G. MANCHESTER
Fred N. Schwend
ATTORNEY

3,004,883
FILM SPLICING DEVICE
Rowe G. Manchester, South San Gabriel, Calif., assignor to Rowe Line Corporation, South San Gabriel, Calif., a corporation of California
Filed Dec. 29, 1958, Ser. No. 788,479
9 Claims. (Cl. 156—506)

This invention relates to splicing devices for films or the like and has particular reference to splicing devices for films in which separate film sections are held together in abutting relation by a transparent patching tape.

A principal object of the invention is to provide a simple and economically manufactured film splicing device of the above type.

Another object is to provide a film splicing device in which a minimum amount of manual manipulation is required to properly butt splice two film sections.

Another object is to provide a motion picture film splicing device which is readily effective to splice two film sections along frame lines separating two adjacent picture frames so that the splice will not be visible when the film is projected.

A further object is to form a butt type film splice in which the film does not display a tendency to buckle or fold along the butting ends of two film sections so spliced.

The manner in which the above and other objects of the invention are accomplished will be readily understood on reference to the following specifications when read in conjunction with the accompanying drawings, wherein:

FIG. 3 is a plan view of the splicer with parts broken away.

FIG. 4 is a transverse sectional view taken along line 4—4 of FIG. 2 illustrating the film locating pin element.

FIG. 5 is a transverse sectional view taken along line 5—5 of FIG. 3.

FIG. 6 is an enlarged plan view of a film splice made in accordance with the present invention.

FIG. 7 is a sectional view through the spring washer.

FIG. 8 is a sectional view similar to FIG. 5 but illustrating a modified form of the invention.

FIG. 9 is a sectional view taken along line 9—9 of FIG. 8.

Figure 2:
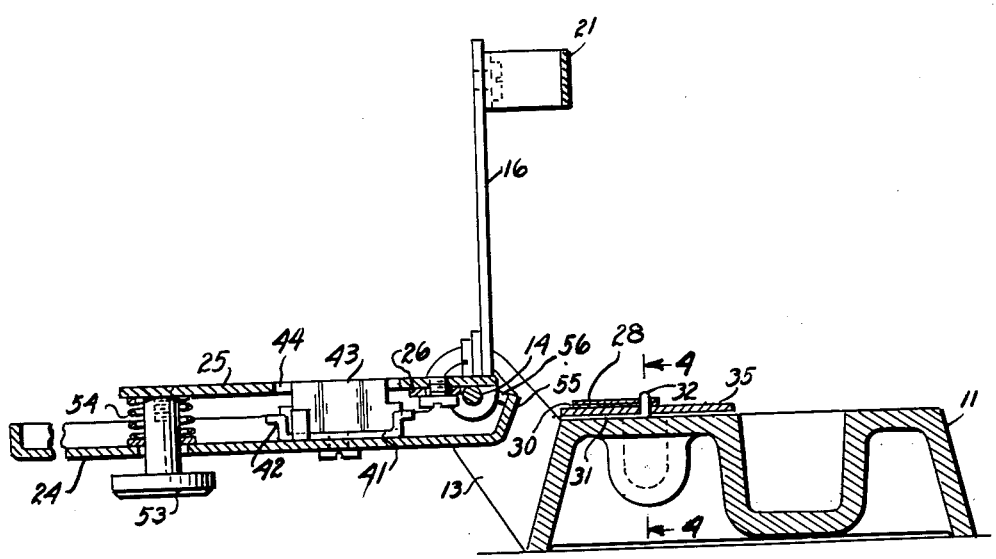
FIG. 2 is a sectional view similar to FIG. 1 but illustrating the film splicer in fully opened condition.

Referring to the drawings, the film splicer comprises a substantially square base 11 having two upwardly extending brackets 12 and 13 at its rear to support a pivot rod 14.

A shearing blade assembly is pivotally mounted on the rod 14 and comprises a pair of spaced blade elements 15 and 16, each secured at one end to a bearing member 17 by a clamp screw 18. The members 17 are both pivotally and slideably mounted on the rod 14.

The opposite ends of the blade elements 15 and 16 are attached by clamp screws 20 to a spring bar 21 which is bowed at 22 (FIG. 5) and urges the blade elements toward each other.

A curved spring washer 23 (FIGS. 3 and 7) is interposed between one of the bearing members 17 and a leg of an arm 24, also pivoted on the rod 14, whereby to also urge one of the blade elements toward the other.

A shearing blade 25 is interposed between the blade elements 15 and 16 and is attached to a bearing member 26, similar to members 17, permitting relative pivotal shearing movement between the shearing blade, and the blade elements. The inward pressure of the blade elements against the shearing blade insures proper shearing action on a transparent pressure sensitive tape 27 laid over the blade elements, as will appear latter.

In order to properly locate a pair of film sections 28 and 30 to be spliced together, a locating pin element 31, of thin spring material is provided having three central pins 32 (FIG. 4) struck upwardly therefrom. Outwardly extending curved sections 33 terminate in additional pins 34. The pins extend through openings in a table pad 35 attached to the base by screws 36 which pass through openings in the element 31 and are threaded into the base to thus hold the same in place. The outer pins 34 pass through enlarged openings 37, permitting such pins to spring outwardly by virtue of the spring sections 33 and thus hold the film sections, whose sprocket perforations 38 are fitted over the pins, in place regardless of any shrunken or stretched condition of the film.

It should be noted that the film sections are placed on the table pad 35 with their adjacent ends in overlapping relation and when properly located by the pins 32 and 34, two picture frames i.e. 40, are located under the shearing blade 25 with the outer frame lines aligned with the edges of the blade.

The arm 24 has attached thereto a knife carrier 41 having outwardly formed tabs 42 between which a thin film cutting knife 43, of spring material, is frictionally held. The knife is generally S shaped as seen in FIG. 3 and is capable of being forced downwardly through an opening 44 in the shearing blade 25 by the arm 24 whereby to cut through both film sections leaving the same in end abutting relationship.

In accordance with the present invention it will be noted that the knife 43 has a center section 45 adapted to sever the film sections along the frame line i.e. 46, defining two adjacent picture frames on respective ones of the film sections. The center section 45 of the knife is joined at opposite ends by generally diagonally extending sections 47 and 48 which are effective to cut parallel outer end sections i.e. 51 and 52, through the marginal sections 50 of the film sections as seen in FIG. 6.

A knob 53 is attached to the free end of the shearing blade 25 and extends through an opening in the arm 24 permitting the blade 25 to be swung downwardly a limited amount relative to the arm 24 by pressing down on the knob. A compression spring 54 surrounds the knob 53 and is interposed between the blade 25 and the arm 24, normally maintaining the cutting edge of the knife 43 within the opening 44 in the shearing blade, thus preventing cutting of one's fingers and protecting the cutting edge from damage.

Figure 1:
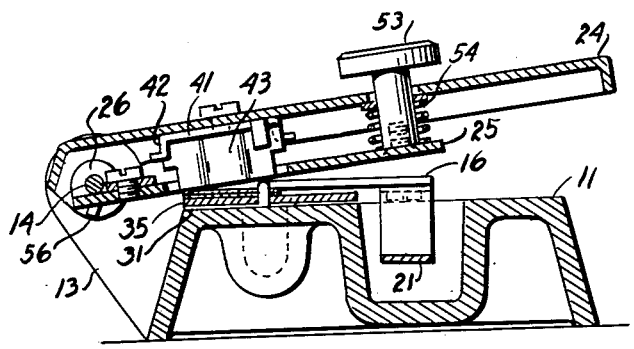
FIG. 1 is a sectional view through a film splicer embodying a preferred form of the present invention, illustrating the same preparatory to cutting a pair of overlapped film sections.

In operating the splicer, the arm 24 is swung to its fully opened position shown in FIG. 2. In so moving, a rear edge 55 of the arm engages extensions 56 projecting from the bearing members 17 thereby raising the blade elements 15 and 16 to an upright position where they do not hinder locating of the film sections to be spliced. Thereafter, the film sections, i.e. 28 and 30 are placed in overlapping relation over the various pins 32 and 34 and onto the surface of the table pad 35. The blade elements 15 and 16 are now swung down to hold the film sections in place and the arm 24 is then swung down past its position shown in FIG. 1 and until the shear blade 25 rests on the surface of the overlapped film sections. Then the arm is pressed further, forcing the knife to cut through both film sections, leaving abutting ends formed as above described.

The arm 24 is then raised, and after the waste ends of the film sections are removed a piece of transparent pressure sensitive tape 27 is paid over the blade elements. The latter preferably has sprocket hole perforations formed therein which are fitted over the center pins 32 to locate the tape in proper position relative to the film sections. The arm 24 is again swung down to a position similar to that shown in FIG. 1 and the knob 53 is pressed down forcing the shearing blade 25 to shear through the tape 27 and to press the section 56, thus sheared, against the two adjoining picture frames of the two film sections.

It will be noted that the edges 57 and 58 of the tape section 56 are directly in line with the outer frame lines of the picture frames under the tape section.

It has been found that, by providing a compression spring 59 of sufficient strength to force the shearing blade 25 to shear through the tape 27, the arm 24 may be used to effect such shearing action being careful not to force the knife 43 through the tape section.

FIGS. 8 and 9 illustrate a modified form of the invention in which the knob 53a is rotatably attached at 58 to the shearing blade 25. In this case, a transversely extending pin 60 is attached to the knob and the latter is normally so located that the pin is aligned with a radially extending slot 61 in the arm 24. Thus, when the arm is pressed down the compression spring 54a which is interposed between the shearing blade 25 and a cup shaped washer 63, will yield to permit the knife to cut the film sections. However, when the knob 53a is turned to move the pin 60 from registering with the slot 61, the arm 24 cannot be moved downwardly relative to the shearing blade, and the film cutting knife will thus be prevented from cutting the film.

After applying a splicing tape to one side of the film sections, the latter may be turned over on the table pad and a second splicing tape applied to the under side of such film sections.

It will be noted that the completed splice results in tab sections 64 and 65 which extend in opposite directions from the center section of the splice, thus materially strengthening the splice against folding or collapsing along the frame line 46, or center of the splice. Obviously, this strengthening of the splice is effected without extending any portion of the abutting ends of the film sections into the picture area thereby resulting in an invisible splice when the film is projected.

Having thus described the invention, what I desire to secure by U.S. Letters Patent is:

1. A film splicing device comprising the combination of means forming a table, means for locating a pair of film sections on said table with end portions thereof in overlapping relation, a shear blade assembly comprising two spaced blade elements adapted to hold said film sections on said table and a shearing blade movable between said blade elements in shearing relation therewith; means for locating said blade elements to extend at right angles to the length of said film sections, said shearing blade having an opening therethrough, a film cutting knife, and means for guiding said knife through said opening and toward said overlapped film portions whereby to cut said portions into abutting ends, said shearing blade being effective to shear a section of splicing tape laid over said blade elements and to press said sheared tape section against adjacent portions of said film sections.

2. A film splicing device comprising the combination of means forming a table, means for locating a pair of film sections on said table, with end portions thereof in overlapping relation, a shear blade assembly comprising two spaced blade elements extending transversely to the length of the film path and adapted to hold said film sections on said table and a shearing blade pivotal about an axis parallel to the length of said film sections and movable between said blade elements in shearing relation therewith; said shearing blade having an opening therethrough, an arm pivotal about said axis, and a knife on said arm movable through said opening and toward said overlapped film end portions whereby to cut said end portions into abutting ends, said shearing blade being effective to thereafter shear a section of splicing tape laid over said blade elements and to press said sheared tape section against adjacent portions of said film sections.

3. A film splicing device comprising the combination of means forming a table, means for locating a pair of film sections on said table with end portions thereof in overlapping relation, a shear blade assembly comprising two spaced blade elements pivotal toward and away from said table about a common axis extending parallel to the length of said film sections and a shearing blade pivotal about said axis and movable between said blade elements in shearing relation therewith, said shearing blade having an opening therethrough, an arm pivotal about said axis, and a knife on said arm movable through said opening and toward said overlapped film end portions whereby to cut said end portions, said shearing blade being effective to thereafter shear a section of splicing tape laid over said blade elements and to press said sheared tape section against adjacent portions of said film sections.

4. A film splicing device comprising the combination of means forming a table, means for locating a pair of film sections on said table with end portions thereof in overlapping relation, a shear blade assembly comprising two spaced blade elements extending transversely to the length of said film sections and adapted to hold said film sections on said table, means for yieldably urging said blade elements toward each other, and a shearing blade movable between said blade elements in shearing relation therewith; said shearing blade having an opening therethrough, a film cutting knife, and means for guiding said knife through said opening and toward said overlapped film portions whereby to cut said portions into abutting ends, said shearing blade being effective to shear a section of splicing tape laid over said blade elements and to press said sheared tape section against adjacent portions of said film sections.

5. A film splicing device comprising the combination of means forming a table, means for locating a pair of film sections on said table with end portions thereof in overlapping relation, a shear blade assembly cooperable with said table, said shear blade assembly comprising two spaced blade elements extending transversely to the length of said film sections for holding said film sections on said table and a shearing blade pivotal about an axis parallel to said table and movable between said blade elements in shearing relation therewith; said shearing blade having an opening therethrough, an arm pivotal about said axis, a knife on said arm movable through said opening and toward said overlapped film end portions whereby to cut said end portions, and yieldable means intermediate said shearing blade and said arm for normally holding said blade retracted in said opening, said shearing blade being effective to shear a section of splicing tape laid over said blade elements and to press said sheared tape section against adjacent portions of said film sections.

6. A film splicing device comprising the combination of means forming a table, means for locating a pair of film sections on said table with end portions thereof in overlapping relation, a shear blade assembly cooperable with said table, said shear blade assembly comprising two spaced blade elements extending transversely to the length of said film sections for holding said film sections on said table and a shearing blade pivotal about an axis parallel to said table and movable between said blade elements in shearing relation therewith; said shearing blade having an opening therethrough, an arm pivotal about said axis, a knife on said arm movable through said opening and toward said overlapped film end portions whereby to cut said end portions, said arm having an opening therethrough, and a manually operable element carried by said shearing blade and extending through said last mentioned opening whereby to move said shearing blade in shearing relation with said blade elements, said shearing blade being effective to shear a section of splicing tape spanning said blade elements and to press said sheared tape section against adjacent portions of said film sections.

7. A film splicing device comprising the combination of means forming a table, means for locating a pair of film sections on said table with end portions thereof in overlapping relation, a shear blade assembly cooperable with said table, said shear blade assembly comprising two spaced blade elements extending transversely to the length of said film sections for holding said film section on said table and a shearing blade pivotal about an axis parallel to said table and movable between said blade elements in shearing relation therewith; said shearing blade having an opening therethrough, an arm pivotal about said axis, a knife on said arm movable through said opening and toward said overlapped film end portions whereby to cut said end portions, and selectively settable means for preventing movement of said knife through said opening, said shearing blade being effective to shear a section of splicing film spanning said blade elements and to press said sheared tape section against adjacent portions of said film sections.

8. A film splicing device according to claim 7 comprising yieldable means for transmitting movement between said arm and said shearing blade.

9. A film splicing device comprising the combination of means forming a table, means for locating a pair of film sections with end portions thereof in overlapping relation, each of said film sections having picture frames spaced in close proximity therealong, a shear blade assembly cooperable with said table, said shear blade assembly comprising two spaced blade elements extending transversely to the length of said film sections for holding said film sections on said table and a shearing blade movable between said blade elements in shearing relation therewith; said shearing blade having an opening therethrough, a film cutting knife, and means for guiding said knife through said opening and toward said overlapped film end portions whereby to cut said film end portions, said knife being arranged to cut said film sections along a frame line separating two adjacent picture frames on respective ones of said film sections and along substantially diagonal lines extending outwardly from said frame lines and at least substantially parallel to each other, said shearing blade being effective to shear a section of splicing tape spanning said blade elements and to press said sheared tape section against adjacent portions of said film sections.

References Cited in the file of this patent

UNITED STATES PATENTS

| | | |
|---|---|---|
| 1,598,445 | Howell | Aug. 31, 1926 |
| 2,021,016 | Narath | Nov. 12, 1935 |
| 2,318,287 | Brolin | May 4, 1943 |
| 2,565,009 | Wallingsford | Aug. 21, 1951 |
| 2,660,221 | Simpson | Nov. 24, 1953 |
| 2,664,139 | Speed | Dec. 29, 1953 |
| 2,672,180 | Nichols et al. | Mar. 16, 1954 |
| 2,842,184 | Manchester | July 8, 1958 |